United States Patent [19]
Schneider

[11] Patent Number: 5,281,194
[45] Date of Patent: Jan. 25, 1994

[54] MAGAZINE FOR TOOLS AND/OR WORKPIECE WITH REMOVING DEVICE

[75] Inventor: Manfred Schneider, Bosingen, Fed. Rep. of Germany

[73] Assignee: Hirschmann GmbH, Fluorn-Winzeln, Fed. Rep. of Germany

[21] Appl. No.: 883,962

[22] Filed: May 15, 1992

[30] Foreign Application Priority Data

May 17, 1991 [DE] Fed. Rep. of Germany ....... 4116091

[51] Int. Cl.⁵ .......................... B23Q 3/157; B23Q 7/04
[52] U.S. Cl. ..................................... 483/14; 211/1.52;
211/96; 483/38; 483/62; 483/64; 483/901
[58] Field of Search ...................... 483/60, 61, 62, 63,
483/64, 66, 67, 901, 14, 38; 211/1.52, 1.53, 1.54,
1.55, 1.57, 96, 168

[56] References Cited

U.S. PATENT DOCUMENTS

| | | |
|---|---|---|
| 1,554,818 | 9/1925 | Greenstreet ....................... 211/96 X |
| 3,339,273 | 9/1967 | Knosp . |
| 3,355,798 | 12/1967 | Drechsler . |
| 4,087,901 | 5/1978 | Lohneis et al. .................... 483/61 X |
| 4,119,213 | 10/1978 | Sato et al. ........................ 483/61 |
| 4,587,716 | 5/1986 | Bytow . |
| 4,637,121 | 1/1987 | Wortmann .......................... 483/901 |
| 4,783,902 | 11/1988 | Novak ............................ 211/1.52 X |
| 4,920,631 | 5/1990 | Novak ............................ 483/66 X |
| 4,945,628 | 8/1990 | Novak ............................ 483/66 X |
| 4,985,983 | 1/1991 | Otto et al. ........................ 483/61 X |
| 5,107,581 | 4/1992 | Reuter et al. ..................... 483/61 |

FOREIGN PATENT DOCUMENTS

| | | |
|---|---|---|
| 0132599 | 2/1985 | European Pat. Off. . |
| 0319914 | 6/1989 | European Pat. Off. . |
| 3336232 | 4/1985 | Fed. Rep. of Germany ........ 483/61 |
| 56-163856(A) | 12/1981 | Japan . |

OTHER PUBLICATIONS

"Werkstatt und Betrieb" 120 (1987) 12 pages 998–1002: Umfangreiche Kombinations-moglichkeiten flexibler Fertigungseinrichtungen by Schulze Dieckhoff.

*Primary Examiner*—Z. R. Bilinsky
*Attorney, Agent, or Firm*—Irvin A. Lavine

[57] ABSTRACT

The tool or workpiece magazine has tool holders disposed on a circle, from which holders the tools or workpieces can be removed by means of a removing device disposed centrally relative to the circular arc. This removing device comprises a column which is turnable around the axis thereof and on which a carriage is axially and slidably mounted. The carriage in turn carries transversely extendable telescoping arms, at the free end of which there is disposed a gripper having gripping jaws. Slots in tool carriers attached horizontally on movable panels are used as tool or workpiece holders. The panels can be moved outward of the magazine for stocking purposes.

17 Claims, 5 Drawing Sheets

5,281,194

MAGAZINE FOR TOOLS AND/OR WORKPIECE WITH REMOVING DEVICE

BACKGROUND OF THE INVENTION

The invention relates to a magazine for tools and/or workpieces with a removing device.

By use of such magazines, tools or workpieces are kept ready for placement in automatically loaded machine tools. Such tool or workpiece magazines can be employed advantageously in electrical-discharge machine tools, in which a large number of cutting electrodes frequently must be employed successively.

The present invention is an improvement over a known magazine with a removal device, as is described, for example, in EP 0 132 599 A1. In this tool magazine, a plurality of disk-shaped tool carriers for holding the tools or workpieces are mounted on one shaft, having carriers for tools suspended at the periphery. For removal or deposition of a tool or workpiece, this magazine must be turned to a suitable position, whereupon the tool or workpiece is removed or deposited by a removing device. The removing device comprises a turnable vertical post, on which there is axially slidably mounted a carriage, which in turn carries a pivotably mounted transport arm with a gripping device.

Such a magazine undoubtedly has a very great capacity. On the other hand, the manipulation of a magazine portion that is loaded with a large number of tools or workpieces and that must be turned in order to remove or deposit a tool or workpiece is not without problems, because of the considerable weight. Moreover, the removing device, which includes an L-shaped pivotably mounted transport arm, is complex in terms of structure and control.

The object of the present invention is therefore to provide a magazine and a removing device which enable short access times to be achieved in combination with large magazine capacity, and wherein both the magazine and the removing device with their programmable controller have the simplest possible construction.

SUMMARY OF THE INVENTION

According to the basic idea of the invention, the tools or workpieces contained in the magazine are disposed on a circular arc, at the center of which a turning post of the removing device is provided. Each storage place of the magazine can therefore be accessed by a simple turning movement and by radial forward movement of a horizontally extendable telescoping arm of the removing device.

In an actual embodiment of the invention, a housing formed from individual panels, at the center of which there is disposed the turning post with the removing device, is provided as the magazine. According to a further aspect of this arrangement, the panels can be opened outward, so that they can be rapidly stocked in a simple and convenient way. According to a further aspect of the invention, such a housing must be provided with at least one window, through which the telescoping arm can be extended, in order to be able to supply a workpiece or tool to an external workplace.

A particularly simple movement sequence and thus a simple control system are achieved for the removing device due to the tool or workpiece holders of the carrier being radially oriented slots that are open toward the turning post. In these slots the tools or workpieces can be suspended, and therefore they can be removed or deposited by simple transverse movement of a telescoping arm equipped with a gripper.

Instead of slots in a plate, studs that project approximately radially toward the turning post can be provided on the tool or workpiece carriers, onto which studs the tools and/or workpieces provided with stud seats can be pushed.

Depending on the intended use, the panels of the housing can be disposed in U-shaped or circular configuration, and which are stocked with the tool or workpiece carriers. One or more windows are provided in the housing. The number of windows depends on the number of workplaces to be serviced. Thus it is possible, with the same magazine, to load a plurality of different workplaces, preferably two, with tools or workpieces from the magazine.

The capacity of the magazine can be multiplied if a plurality of tool or workpiece carriers are disposed one above the other in tiers on the inside faces of the panels.

These panels are preferably swinging doors having hinges at a side of each door.

Should even the capacity thereof not be sufficient, the panels can be provided with tool or workpiece carriers on both sides. In this case the panels are each center-mounted for rotation, so that, by a 180° rotation, the face initially located on the outside can be pivoted to the inside. This also permits restocking of the magazine without work interruption.

In a further aspect of the invention, symmetric polygonal bodies, the flat outside faces of which are equipped with tool or workpiece carriers, are provided. These polygonal bodies, which are rotatably center mounted, can be, for example, a triangular or a rectangular, preferably square body in plan view.

Compared with known magazines, the structure according to the invention offers the following advantages:

1. The weights to be moved during removal of tools and workpieces are relatively small, and so the access times are short.
2. Despite large capacity, the magazine constructed in the form of a housing has a relatively small space requirement.
3. The openable panels to which the magazine ledges are attached permit simple stocking of the magazine, if desired without according to the removing device.
4. The movement sequences of the removing device are simple, which is favorable for control and manufacturing costs.
5. Depending on the intended application plural, windows may be provided in the housing, so that a plurality of machines or similar workplaces can be loaded with tools or workpieces from the same magazine.

BRIEF DESCRIPTION OF THE DRAWINGS

The subject matter of the invention is explained in detail in the following description of various practical examples, which are schematically illustrated in the drawings, wherein.

DESCRIPTION OF THE PREFERRED EMBODIMENTS

Figure 1:
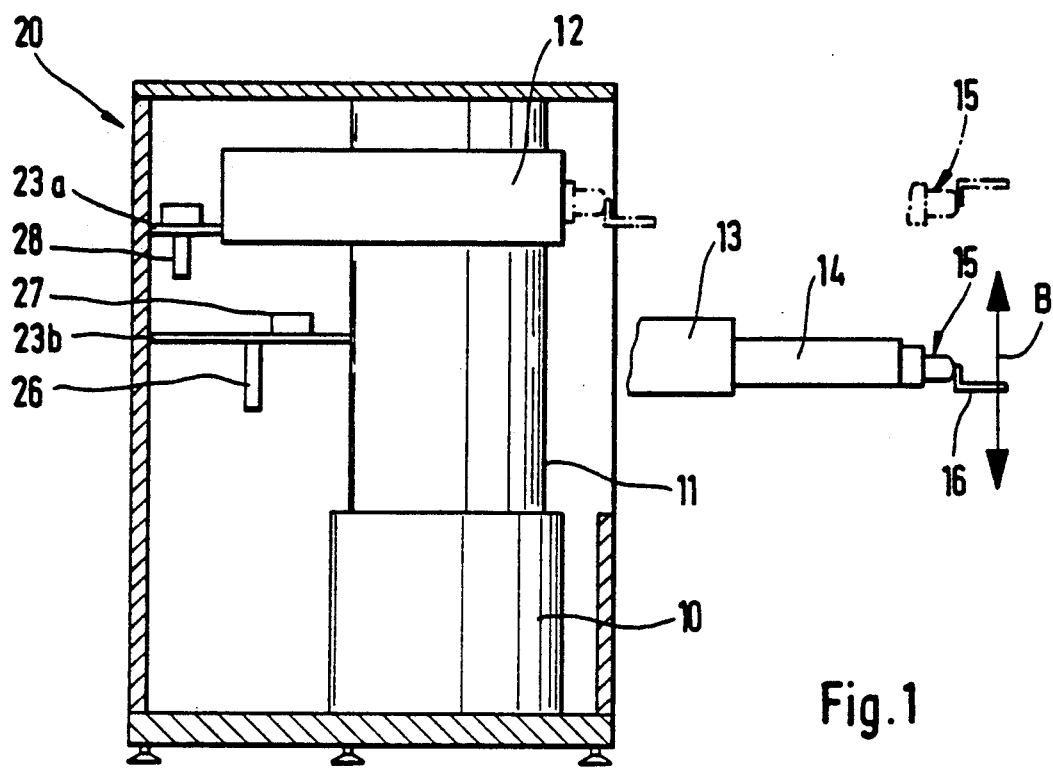
FIG. 1 is a partial cross-sectional view taken from the side of a first embodiment of a magazine according to the invention, a telescoping arm with gripper being shown in three different working positions.
Figure 2:
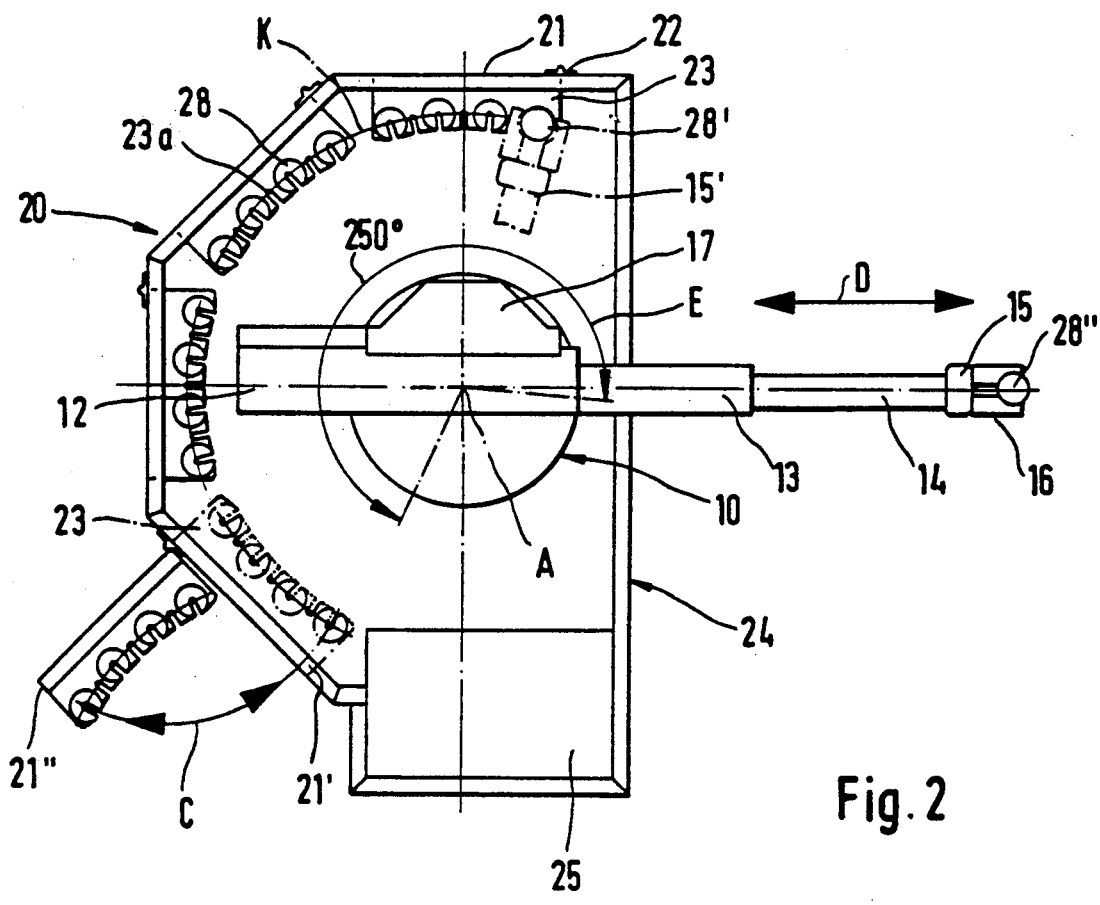
FIG. 2 is a top view of the apparatus of FIG. 1, without a cover plate.

The basic structure of the tool or workpiece magazine configured according to the invention is illustrated by FIGS. 1 and 2. In the practical examples shown in the other figures, identical parts are denoted by the same numbers and parts corresponding to each other are denoted by numbers with different tens digits but corresponding units digits.

The magazine comprises a housing 20, which has panels constructed in the form of swinging doors 21. These swinging doors 21 are pivotable around vertical hinges 22 and are therefore openable. On the inside faces of the swinging doors 21 there are located magazine ledges 23 with radially oriented and inwardly open slot-like holders 23a. In these holders there are removably suspended tools 26, e. g., electrodes in the case of electrical-discharge machine tools, pallets 27 for workpieces or electrodes 28 equipped with retainers. As shown in FIG. 2 the tool or workpiece holders 23a are disposed on a horizontally oriented circular arc K, the center of which is located on the axis of the turning post 10. Hence, the magazine extends at least partially about turning post 10. On this central turning post 10, with which a drive 11 is associated, a carriage 12 is mounted and is axially slidably. The carriage in turn carries, for movement in the direction of the double arrow D, a radially extendable telescoping arm 13, 14, which at its free end carries a gripper 15 with gripping jaws 16. The forward movement of the telescoping arm 13, 14 is powered by a drive 17 disposed on the carriage.

By means of the, schematically illustrated drives, the turning post 10 can be rotated through the angle E, which is indicated as 250° on FIG. 2, the carriage 12 can be moved vertically in the direction of the double arrow B; the telescoping arm 13, 14 can be retracted and extended transversely in the direction of the double arrow D; and the gripper 15 can be rotated on the axis of the telescoping arm 13, 14 from an upper to a lower position, as is illustrated at the right of FIG. 1. These movements are controlled by means of a programmable control unit 25 corresponding to the desired or necessary work sequence. Thus, as indicated with the gripper 15' in FIG. 2, the tool 28' can be removed from the magazine ledge 23 by transverse backward movement and, after rotation of the turning post 10 and extension of the telescoping arm 13, 14, which passes through the window 24 of the housing 20, the gripper 15 can be moved forward transversely to a workplace, e. g., to an electrical-discharge machine tool (not shown), whereupon the gripper 15 is moved in direction B to the chuck of the machine for removal of the tool 28'.

For stocking the magazine, one of the swinging doors, for example the swinging door 21', can be opened to the position 21", as is indicated by the double arrow C, and in which position the inner face of the door is relatively more remote from the turning post 10 than in the closed position indicated by swinging door 21'. A or workpiece stock can be installed while the door is open.

Figure 3:
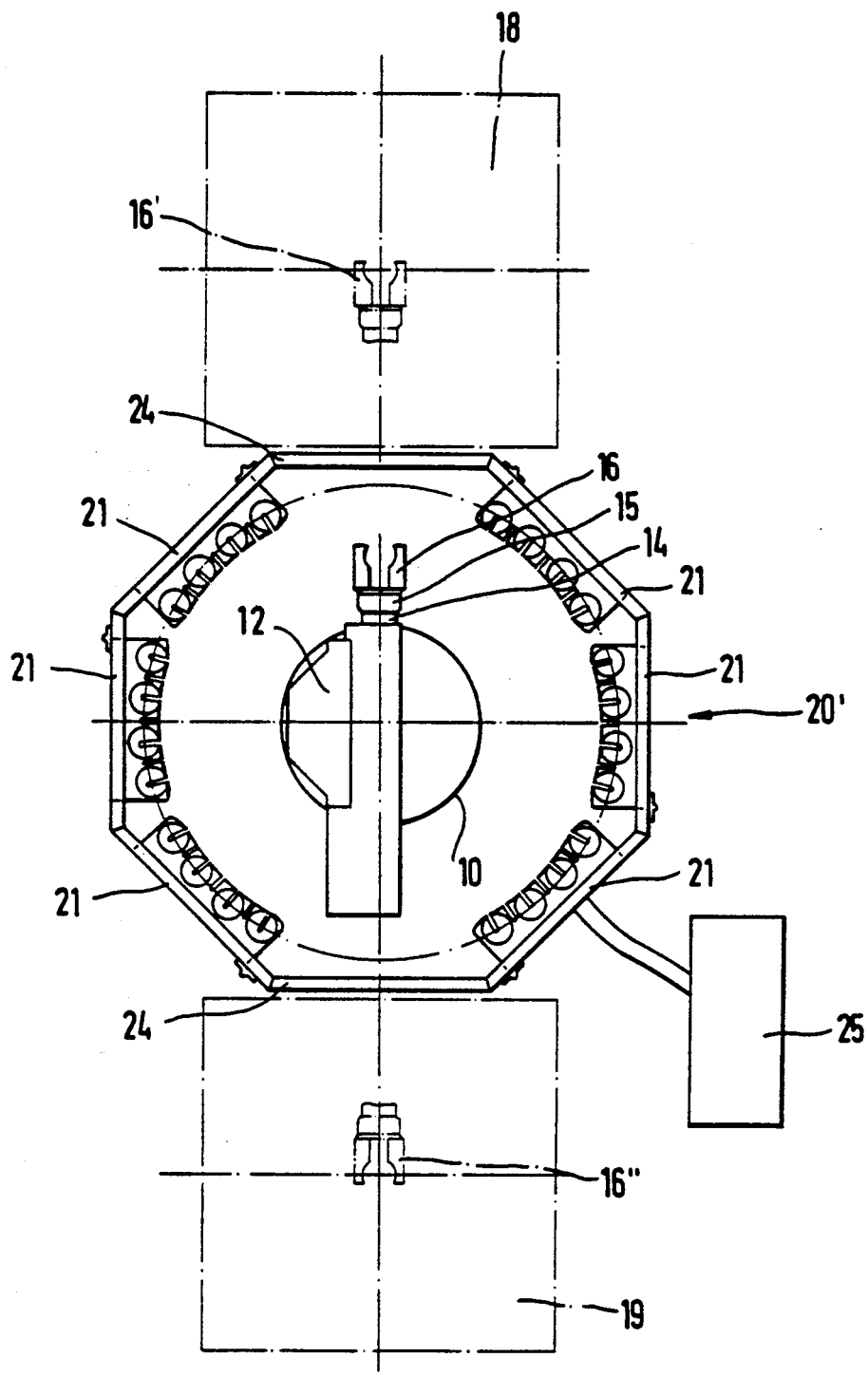
FIG. 3 is a top view, similar to FIG. 2, of a second embodiment of a magazine according to the invention.

In the second embodiment according to FIG. 3, where the panels 21 constructed as swinging doors are grouped circularly around the turning post 10, the magazine permits the servicing of two workplaces 18 and 19, which in this case are disposed diametrically opposite each other and adjacent to the oppositely positioned windows 24 of the magazine 20'. Thus the gripper 15 provided with the gripping jaws 16 and mounted on the telescoping arm, 14 can be moved into the positions denoted 16' or 16" depending on the position of the turning post 10.

Figure 4:
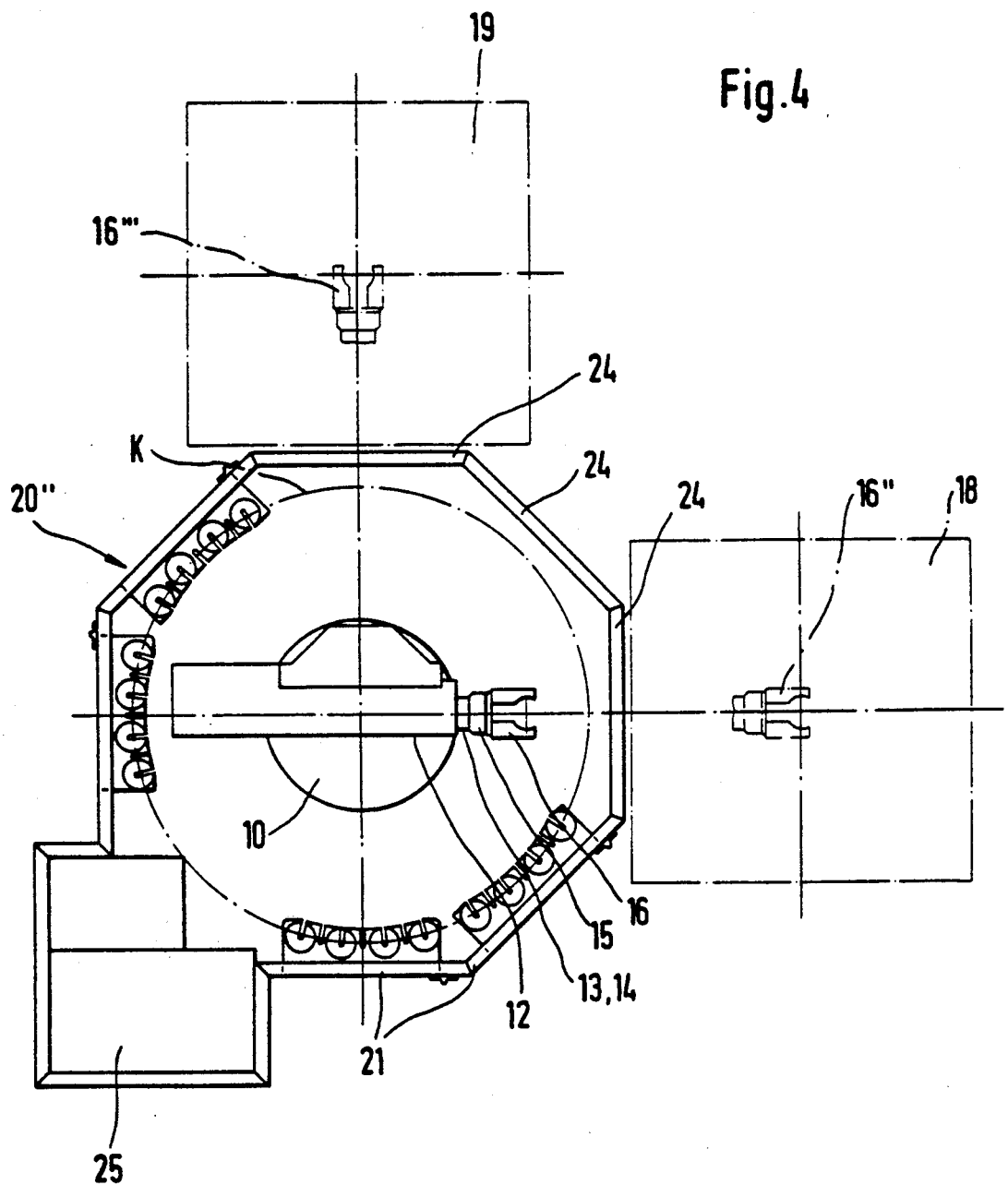
FIG. 4 is a top view, similar to the top view of FIG. 2, of a third embodiment of a magazine according to the invention.

In the embodiment according to FIG. 4, two workplaces 18 and 19, which in this case are disposed at an angle relative to each other, can also be serviced by means of the same magazine or the same removing device, the gripper and gripping jaws of which can be extended into the positions symbolized by 16" and 16''' depending on the positioning of the turning post 10. In this arrangement also the housing 20" is approximately circular in plan view, or more precisely has the shape of an octagon. The tool or workpiece holders, which are indicated only symbolically, are disposed on a circle K, and so removal or deposition of tools and/or workpieces can be achieved by very simple pivoting and transverse movements of the telescoping arm 13, 14.

Figure 5:
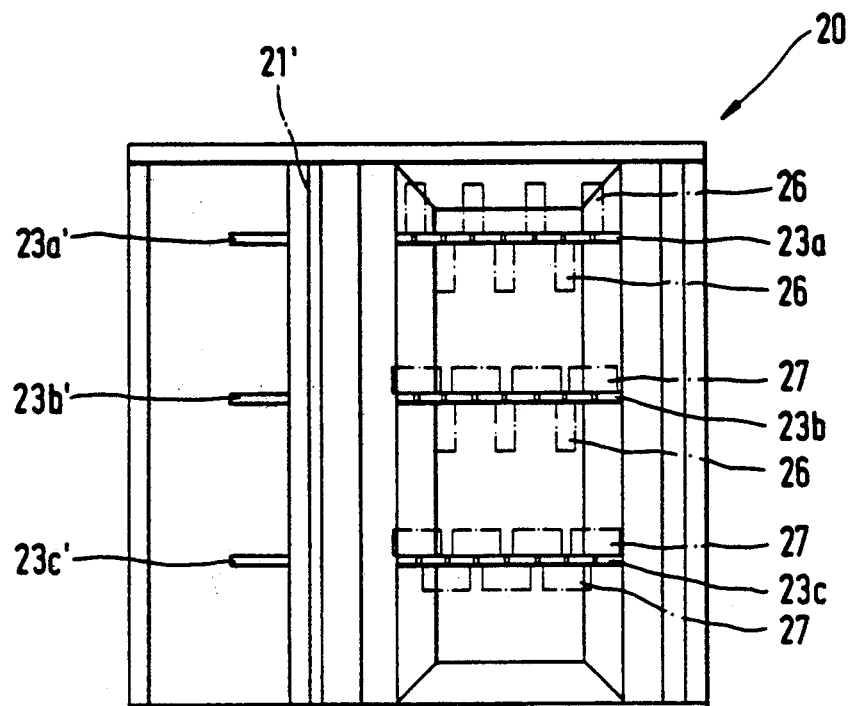
FIG. 5 is a side view of a housing portion with swinging doors in closed and open positions.
Figure 6:
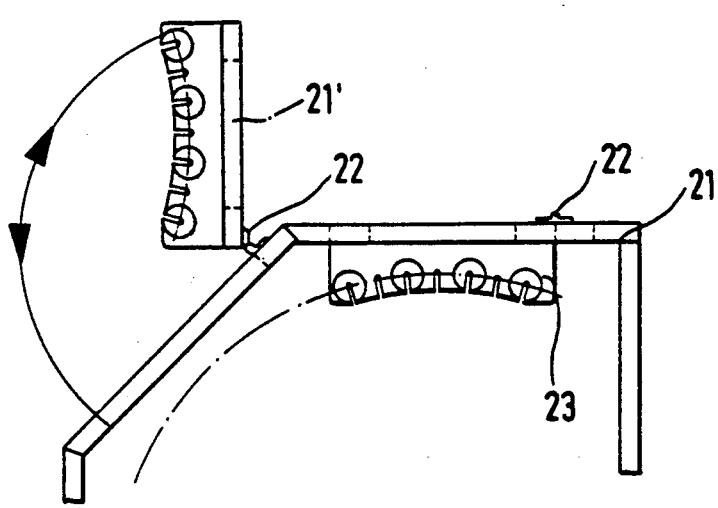
FIG. 6 is a top view of the housing portion illustrated in FIG. 5, without a cover plate.

FIGS. 5 and 6 illustrate a different embodiment for the stocking of tools or workpieces. On the top magazine ledge 23a in FIG. 5, there are positioned cutting electrodes 26, some in standing condition, some in hanging condition. On the middle magazine ledge 23, workpiece pallets 27 are stored on the top side and cutting electrodes on the bottom side, while the bottom magazine ledge 23 of the magazine ledges disposed one above the other in tiers carries workpiece pallets in standing and hanging condition.

For the purpose of restocking or for exchange of tools or workpieces, the swinging door 21 merely has to be opened to the position denoted by 21', as the top view according to FIG. 6 clearly shows.

Figure 7:
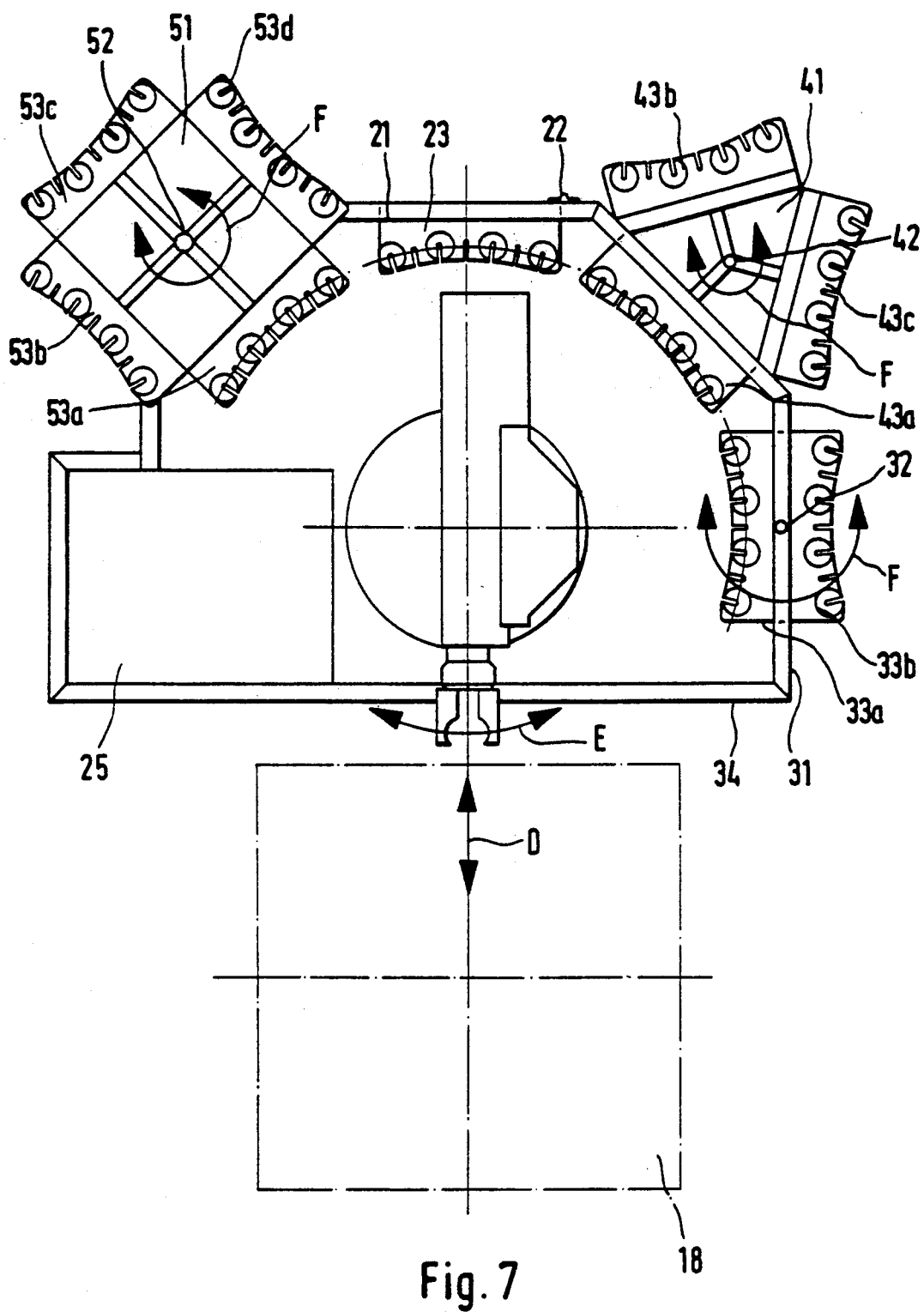
FIG. 7 is a top view, similar to FIG. 2, of a magazine according to the invention, with a swinging door and rotatable polygonal bodies with magazine ledges.

Should the capacity of a magazine with panels constructed in the form of swinging doors, as shown in the embodiments of FIGS. 1 to 6 not be sufficient, further embodiments may be provided, as schematically illustrated in the top view according to FIG. 7.

Instead of the panel constructed in the form of a simple swinging door 21, there can be provided a double faced body 31 which is horizontally turnable around the central vertical bearing 32 and which is equipped on both faces with magazine ledges 33a and 33b. By turning the double faces body 31 in the direction of the double arrow F, the magazine ledges 33a and 33b can be positioned successively in the access region of the loading unit.

For further capacity increase, there are provided panels constructed in the form of symmetric polygonal body, e.g., triangular body 41 or a square body 51 in plane view. The faces of these bodies are equipped respectively with magazine ledges 43a, b c and 53a, b, c, d. These magazine ledges are moved to working or stocking position by turning the bodies around the central bearing 42 or 52.

I claim:

1. Apparatus for supporting tools and/or workpieces in hanging and/or standing position and for removing and depositing of the tools and/or workpieces, comprising:
- a vertical turning post,
- a carriage with a horizontally extendable telescoping arm mounted on said turning post for movement thereon,
- said arm having a free end, and a gripper at said free end,
- programmably controlled drives for the turning post, the carriage, and the telescoping arm,
- a magazine extending at least partially about said turning post, said magazine comprising plural panels, each having a face having tool and/or workpiece holders thereon, and
- means for movably mounting at least one of said panels for movement between a first position in which said panel face is towards and relatively close to said turning post and in which tools and/or workpieces on said holders are engageable by said gripper, and a second position in which said face is relatively remote from said turning post and said holders are accessible from the outside of said magazine for the placing thereon or removal therefrom of tools and/or workpieces,
- said magazine having at least one window through which the telescoping arm may be extended.

2. Apparatus according to claim 1, wherein said holders comprise substantially radially oriented slots open toward the turning post in which the tools and/or workpieces can be suspended.

3. Apparatus according to claim 1, wherein said holders comprise substantially studs which project radially toward the turning post and onto which the tools and/or workpieces provided with stud seats can be pushed.

4. Apparatus according to claim 1, wherein the panels of the magazine are disposed in U-shaped configuration relative to the turning post and the window is provided on the open side of the U-shaped magazine.

5. Apparatus according to claim 1, wherein at least some of said panels of the magazine are disposed in an arc relative to the turning post.

6. Apparatus according to claim 1, wherein a plurality of holders are disposed one above the other in tiers on the insides of at least one of said panels.

7. Apparatus according to claim 1, wherein each of said panels is mounted for swinging movement at one of the sides thereof.

8. Apparatus according to claim 1, wherein at least one said panel is mounted for horizontal swinging on a central vertical bearing, and both faces of which are equipped with tool or workpiece holders.

9. Apparatus according to claim 5, there being at least two windows in said magazine, whereby to effect loading of two workplaces from said magazine.

10. Apparatus according to claim 1, and a programmably controlled drive for said gripper.

11. Apparatus for supporting tools and/or workpieces in hanging and/or standing position and for removing and depositing of the tools and/or workpieces, comprising:
- a vertical turning post,
- a carriage with a horizontally extendable telescoping arm mounted on said turning post for movement thereon,
- said arm having a free end, and a gripper at said free end,
- programmably controlled drives for the turning post, the carriage, and the telescoping arm,
- a magazine adjacent said turning post, said magazine comprising at least one polygonal body having plural faces thereon, each said face having tool and/or workpiece holders thereon, and
- means for pivotably supporting said polygonal body for movement about a vertical axis for movement of each said face between a first position in which a said face is towards and relatively close to said turning post and in which tools and/or workpieces on said holders are engageable by said gripper, and a second position in which said face is relatively remote from said turning post and said holders are accessible from the outside of said magazine for the placing thereon or removal therefrom of tools and/or workpieces,
- said magazine having at least one window through which the telescoping arm may be extended.

12. Apparatus according to claim 11, wherein said polygonal body has two sides in substantially parallel relationship.

13. Apparatus according to claim 11, wherein said polygonal body has three panels in triangular relationship.

14. Apparatus according to claim 11, wherein said polygonal body has four panels in rectangular relationship.

15. Apparatus according to claim 11, wherein there are plural said polygonal bodies each having faces having tool and/or workpiece holders thereon, and a said means for pivotably supporting each said polygonal body.

16. Apparatus according to claim 11, wherein said faces of said polygonal bodies when in said first position thereof are substantially on an arc bout said turning post.

17. Apparatus according to claim 11, and a programmably controlled drive for said gripper.

* * * * *